Figure 1:
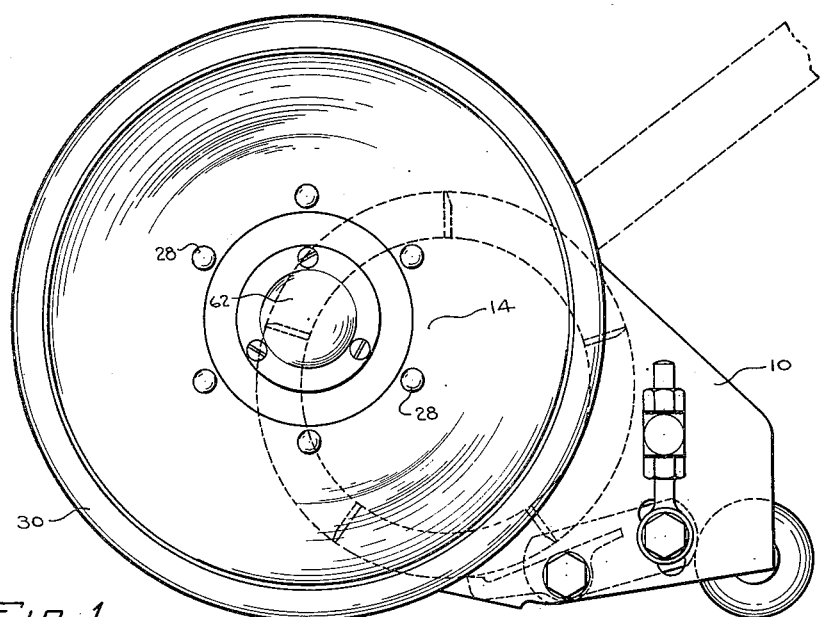

Nov. 29, 1938.   T. B. FUNK   2,138,786

LAWN MOWER CONSTRUCTION

Filed June 19, 1936

Inventor
TRUMAN B. FUNK

By Beaman & Langford

Attorney

Patented Nov. 29, 1938

2,138,786

UNITED STATES PATENT OFFICE 2,138,786

LAWN MOWER CONSTRUCTION

Truman B. Funk, Jackson, Mich., assignor to "Yard-Man", Inc., Jackson, Mich., a corporation of Michigan Application June 19, 1936, Serial No. 86,101

10 Claims. (Cl. 56—249)

The present invention relates to improvements in lawn mower construction, being particularly concerned with wheel and dustproofing structure for the mechanism associated with the wheel.

As attractiveness and appearance of durability is required by present day constructions as well as performance and low initial cost and maintenance, it became of special importance that all these features be built into the lawn mower in the most efficient and economical manner. This has not been possible through coherence along the line of present practices. Accordingly, one feature of the present invention resides in novel structural changes which have enhanced the appearance of the lawn mower wheel and added materially to the appearance of durability to the lawn mower. Another feature is found in the dustproofing structure of the wheel and associated parts.

An object of this invention is to provide stamped sheet metal lawn mower wheels which are inexpensive in construction, attractive, and adds to the appearance of durability and sturdiness to the entire lawn mower construction.

Another object resides in novel dustproofing structure in lawn mower wheel construction having internal driving mechanism.

These and other objects of the invention will appear from the following detailed description and are especially covered in the appended claims.

In the drawing

Figure 3:
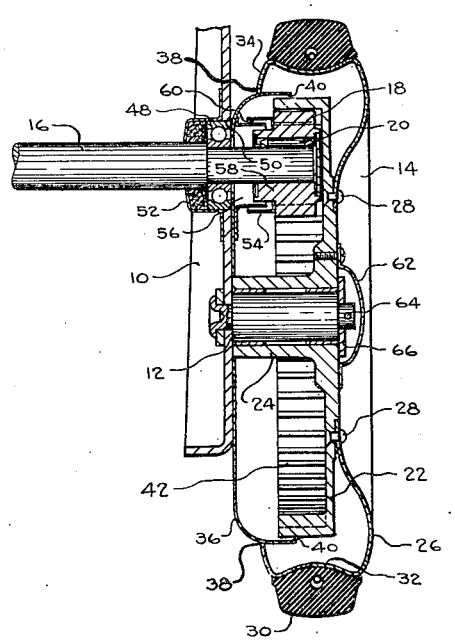
Figure 2:
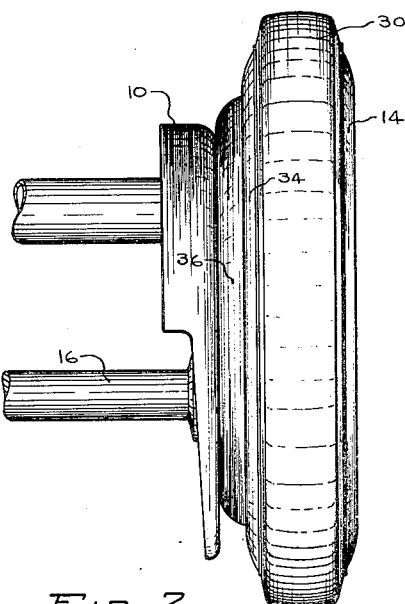

Fig. 1 is a side elevational view of a lawn mower wheel and side frame embodying the present invention, Fig. 2 is a plane view of the opposite wheel construction shown in Fig. 1, and Fig. 3 is a cross sectional view taken through the wheel structure.

Referring to the drawing, a sheet metal side frame 10 supports a shaft 12 upon which the wheel structure 14 is supported for rotation upon suitable bearings. Supported for rotation and extending through the frame 10 is the cutting reel shaft 16 which carries a gear 18 upon its outer end. Suitable clutch mechanism such as rollers 20 operating upon inclined surfaces in a well known manner permits free wheeling between the shaft 16 and gear 18 when the wheel 14 is rotated in one direction and establishes a driving connection when rotated in an opposite direction.

The wheel 14 is preferably constructed from a cast internal gear 22 having a hub 24 with the outer periphery and rim fabricated from a sheet metal stamping 26. This stamping is suitably connected to the gear 22 such as by rivets 28. To enhance the appearance of the wheel 14, the stamping 26 is flared out toward the periphery and then inwardly to take the same general contour as the cushion tire 30 so as to simulate the "balloon" tire and wheel used upon automotive vehicles at the present time. A rim portion 32 for the tire 30 is provided by a depressed circumferential part of the stamping. To further enhance the appearance of the wheel 14, in addition to effectively dirt and dust proofing the gear 22, the rim portion 32 terminates in a depending flange 34. This flange overlaps a dish-shaped backing plate 36 fixed to the side frame 10 and which in turn overlaps the gear 22. Only slight running clearance 38 and 40 are provided between the overlapping parts just mentioned which excludes the passage of all large particles of foreign matter and compels minute particles to be directed through 360° in order to find a way into the housing 42 defined by the plate 26 and gear 22. From inspection of Fig. 2, the appearance of durability, sturdiness and attractiveness produced by the aforesaid construction will be fully appreciated.

The end bearing 48 for the shaft 16 is supported within an aperture 50 and a sheet metal stamping 52 supported from the frame 10. A packing gland 54 dustproofs one side of the bearing 48 while the opposite side is protected by two overlapping sheet metal stampings 54 and 56 concentrically supported from the gear 18 and back plate 36, respectively. An extended hub portion 58 of the gear 18 acts as a support for the stamping 56 and compels all foreign matter to be diverted through 360° in passing between the running clearance 60 between the stampings 54 and 56 and the hub 58 to between the opposed ends of the gear 18 and bearing 48. To further dustproof the construction and render the wheel 14 more attractive a removable hub cap 62 is attached by screws to the gear 22 and shields the keyed end 64 and retaining washer 66 of the shaft 12.

While in the preferred form of the invention the flange 34 and backing plate 36 overlap, the desired appearance of my wheel construction would not be altered with these parts in non-overlapping closely associated relation which would have the effect of maintaining the smooth unbroken contour of the wheel. In such an arrangement it may even be found desirable to support the inner edge of the flange 34 from the periphery of the gear 22.

While I do not exclude a wheel in which there is no tire carried by the sheet metal rim from within the scope of the appended claims, the tire 30 is an important part of my wheel structure as it enlarges the wheel to the desired diameter and permits the depth of the flange 34 to be relatively narrow. In addition the tire absorbs and distributes shock directed against the wheel and eliminates distortion of the rim that might otherwise result because the sheet metal part is supported entirely from one side.

Having thus described my invention what I desire to protect by Letters Patent and claim is:

1. In a lawn mower construction, a wheel comprising a cast gear and hub, a sheet metal rim and outside part concentrically supported from said cast gear extending over and housing the peripheral portion of said gear, said part having a rim portion and an inside depending flange.

2. In a lawn mower construction, a wheel comprising a cast gear and a sheet metal stamping housing the peripheral portion of said gear, means for securing said gear and stamping together for rotation as a unit, said stamping including a rim supporting web, a fixed backing plate, a lateral part of said stamping defining a rim portion and overlapping said backing plate.

3. In a lawn mower, a wheel comprising a cast internal gear having a central hub, a shaft upon which said hub is supported for rotation, a dish-shaped sheet metal backing plate fixed against rotation overlapping the outer periphery of said gear, and a sheet metal stamping defining the peripheral part of the wheel concentrically supported from said gear and overlapping said backing plate.

4. In a lawn mower construction, a side frame, a cutting reel shaft supported from said frame and having one end extending therethrough to the outer side of said frame, a dish-shaped backing plate fixed to the outside of said side frame and opening outwardly, a shaft supported from said side frame concentrically disposed within said backing plate, a wheel including an internal gear rotatably supported upon said shaft and having its outer periphery overlapped by the outer periphery of said backing plate, and a sheet metal rim defining part concentrically supported and fixed to rotate as a unit with said gear completely housing the peripheral portion of said gear and overlapping a peripheral portion of said backing plate.

5. In a lawn mower construction, a side frame, a cutting reel shaft supported in said side frame and extending therethrough, a shaft supported from said side frame disposed on the outside thereof, a dish-shaped backing plate concentric with said shaft and mounted on the outside of said side frame, a wheel having a central hub portion supported on said shaft for rotation, an outer side portion of said wheel adjacent its periphery flaring outwardly beyond said hub then inwardly to define a rim portion, said rim portion having on the inner side a depending flange flaring inwardly toward said side frame and overlapping said backing plate, and a tire supported upon said frame portion of a cross section carrying out the general contour of the flared portions of said wheel.

6. In a lawn mower construction, a side frame, a cutting reel shaft supported for rotation in said side frame and extending through to the outer side of said side frame, driven means geared to the portion of said shaft extending to the outer side of said frame, and a seal comprising two overlapping parts concentrically disposed with reference to said shaft, one of said parts being fixed to said side frame and the other of said parts rotating as a unit with said means.

7. A construction as set forth in claim 6 in which both of said sealing parts overlap a concentric portion of said means.

8. In a lawn mower construction, a side frame, a dish-shaped backing plate supported on the outside of said frame and opening outwardly, a shaft supported from said side frame concentrically disposed within said backing plate, a wheel supported for rotation on said shaft including an internal gear opening inwardly, the gear being disposed within said backing plate with the peripheral portions of said gear and backing plate in overlapping relation, and a rim portion fixed to said gear for rotation as a unit and housing the outer periphery thereof, said rim portion having a depending flange overlapping said backing plate, all of said overlapping parts being slightly disposed out of engagement with each other so as to provide a double seal excluding foreign matter from the housing defined between said gear and backing plate.

9. In a lawn mower construction, a fixed sheet metal dish-shaped backing plate opening outwardly, a wheel having a sheet metal part extending from adjacent the hub of the wheel to merge with the peripheral rim portion, a continuation of said rim portion at the inner side being deflected inwardly to provide a depending flange, the inner edge of said flange being contiguous with a peripheral portion of said plate.

10. In a lawn mower construction, a composite cast and stamped sheet metal wheel comprising a cast gear having a hub, and a sheet metal part concentrically affixed to said gear to provide an outer side part, a rim part and a depending inner flange part housing a peripheral portion of said gear.

TRUMAN B. FUNK.